United States Patent
Lin

(10) Patent No.: US 8,717,279 B2
(45) Date of Patent: *May 6, 2014

(54) TOUCH PANEL STRUCTURE

(75) Inventor: Chih-Chung Lin, Taipei (TW)

(73) Assignee: Chih-Chung Lin, Taipei (TW)

( * ) Notice: Subject to any disclaimer, the term of this patent is extended or adjusted under 35 U.S.C. 154(b) by 74 days.

This patent is subject to a terminal disclaimer.

(21) Appl. No.: 13/442,875

(22) Filed: Apr. 10, 2012

(65) Prior Publication Data

US 2013/0215073 A1     Aug. 22, 2013

(30) Foreign Application Priority Data

Feb. 17, 2012   (TW) .............................. 101105169 U

(51) Int. Cl.
*G09G 3/36* (2006.01)
*G06F 3/044* (2006.01)
*G06F 3/046* (2006.01)

(52) U.S. Cl.
USPC ..................... 345/104; 178/18.06; 178/18.07; 345/174

(58) Field of Classification Search
USPC ........... 345/87, 156, 173–174, 179–183, 104; 178/18.05–18.07
See application file for complete search history.

(56) References Cited

U.S. PATENT DOCUMENTS

| | | | |
|---|---|---|---|
| 2011/0242023 A1* | 10/2011 | Lee | 345/173 |
| 2012/0162127 A1* | 6/2012 | Onoda | 345/174 |
| 2013/0215072 A1* | 8/2013 | Lin | 345/174 |

* cited by examiner

*Primary Examiner* — Lun-Yi Lao
*Assistant Examiner* — Jarurat Suteerawongsa

(57) ABSTRACT

A touch panel structure includes a backlight module, a liquid crystal display (LCD) layer, a capacitive sensing layer, a bonding layer, and an electromagnetic sensing layer. The backlight module has at least one extended wall portion to enclose a receiving space therein. The LCD layer and the capacitive sensing layer are bonded together via the bonding layer, and are positioned in the receiving space. The electromagnetic sensing layer is attached to one side of the backlight module opposite to the LCD layer. With these arrangements, the touch panel structure provides more than one touch manner and is therefore more convenient for use.

3 Claims, 1 Drawing Sheet

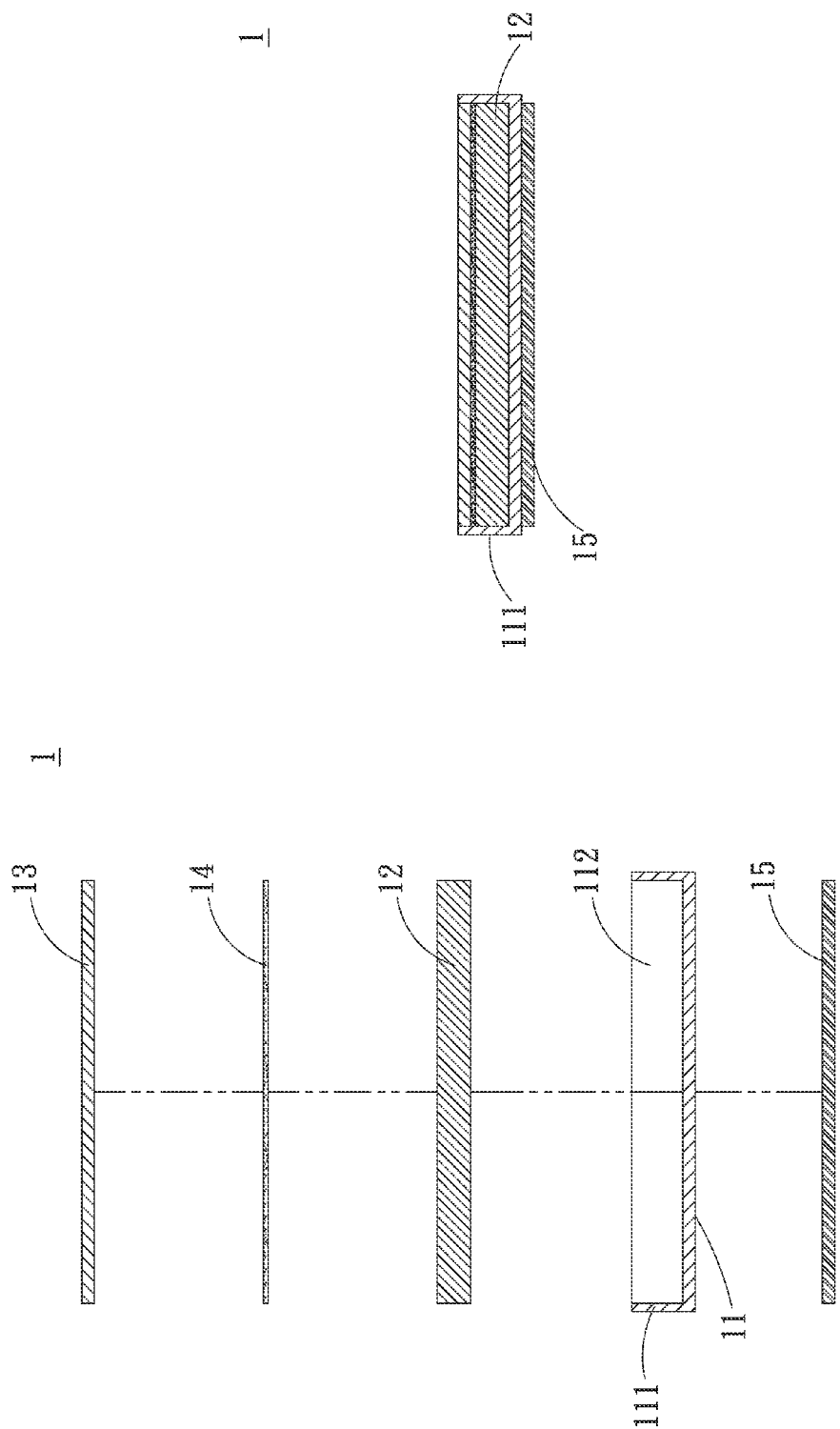

TOUCH PANEL STRUCTURE

This application claims the priority benefit of Taiwan patent application number 101105169 filed on Feb. 17, 2012.

FIELD OF THE INVENTION

The present invention relates to a touch panel structure, and more particularly to a touch panel structure that provides more than one touch manner and is more convenient for use.

BACKGROUND OF THE INVENTION

Due to the quick development in the information technological and communication network fields, various kinds of electronic information products have become highly popular among consumers. Meanwhile, touch panels for electronic information products are also quickly developed. According to the sensing principles thereof, the currently available touch panels can be classified into four major types, namely, resistive, capacitive, electromagnetic, and optical touch panels. Among other, the capacitive touch panel is characterized by its good dust resistance, fire resistance and high definition, and is therefore widely welcomed among users. With the capacitive touch panel, the location of a touched point is determined from change in the capacitance of the touch panel. That is, the coordinates of the touched point on the touch panel is determined from the capacitance change between electrodes resulted from the approach of a conductive object, such as a finger, to the touch panel.

The capacitive touch panel has gradually become the mainstream in the touch technology and is applied to various electronic information products, such as cell phones, tablet computers, walkmans, hand-held electronic devices (apparatus), various displays, monitors, etc. According to the technological principle of these electronic information products using capacitive touch panel, the capacitance change on the touch panel caused by the minor current from human body touching the panel is sensed and further used to detect the change of position of the finger on the touch panel and the function selected through touch, so as to achieve the purpose of controlling the display.

According to the technological principle of electromagnetic touch panel, when the touch panel is touched by a pressure-sensitive electromagnetic stylus internally having a resonant circuit, a change in the magnetic field from a digital antenna occurs. At this point, the electromagnetic touch panel computes the position of the pressure-sensitive stylus, i.e. the location of touch, according to the change in the magnetic flux on the touch panel.

Therefore, the capacitive touch panel and the electromagnetic touch panel have their own touch manner, and these two touch manners are different and respectively have advantages and disadvantages. With the constant progress in various technological fields, consumers now demand more for the applicability and usability of the touch panel, and a touch panel providing only one touch manner gradually fails to satisfy the consumers' requirements.

SUMMARY OF THE INVENTION

It is therefore a primary object of the present invention to provide a touch panel structure that provides more than one touch manner and is more convenient for use.

To achieve the above and other objects, the touch panel structure according to a preferred embodiment of the present invention includes a backlight module, a liquid crystal display (LCD) layer, a capacitive sensing layer, a bonding layer, and an electromagnetic sensing layer. The backlight module has at least one extended wall portion formed on an outer periphery thereof to enclose a receiving space therein. The LCD layer is arranged in the receiving space. The capacitive sensing layer is attached to one side of LCD layer opposite to the backlight module and located in the receiving space. The bonding layer is applied to between the LCD layer and the capacitive sensing layer to bond them to each other. The electromagnetic sensing layer is attached to one side of the backlight module opposite to the LCD layer. With these arrangements, the touch panel structure provides more than one touch manner and is therefore more convenient for use.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein FIG. 1 is an exploded sectional view of a touch panel structure according to a preferred embodiment of the present invention; and FIG. 2 is an assembled view of FIG. 1.

DETAILED DESCRIPTION OF THE PREFERRED EMBODIMENTS

The present invention will now be described with a preferred embodiment thereof and with reference to the accompanying drawings.

Please refer to FIGS. 1 and 2 that are exploded and assembled sectional views, respectively, of a touch panel structure 1 according to a preferred embodiment of the present invention. As shown, the touch panel structure 1 includes a backlight module 11, a liquid crystal display (LCD) layer 12, a capacitive sensing layer 13, a bonding layer 14, and an electromagnetic sensing layer 15. The backlight module 11 has at least one extended wall portion 111 formed on an outer periphery thereof. In the illustrated embodiment, the extended wall portion 111 is provided on two pairs of opposite edges of the backlight module 11, so that a receiving space 112 is enclosed in the extended wall portion 111.

The LCD layer 12 is arranged in the receiving space 112. In the illustrated embodiment, the LCD layer 12 uses a glass material as its substrates without being limited thereto. That is, the substrates of the LCD layer 12 may also be made of polyethylene terephthalate (PET), polycarbonate (PC), polyethylene (PE), polyvinylchloride (PVC), polypropylene (PP), polystyrene (PS), polymethylmethacrylate (PMMA), or cyclo olefin copolymer (COC). Further, the LCD layer 12 arranged in the receiving space 112 has its peripheral edges fitly contacting with the extended wall portion 111.

The capacitive sensing layer 13 is attached to one side of the LCD layer 12 opposite to the backlight module 11, and is also located in the receiving space 112 with its peripheral edges fitly contacting with the extended wall portion 111, so that the touch panel structure 1 is able to sense any capacitance change thereof caused by a minor current from human body. With these arrangements, it is able to achieve the purpose of controlling the display on the touch panel through touching the latter.

The bonding layer 14 is applied to between the LCD layer 12 and the capacitive sensing layer 13. In the illustrated embodiment, the bonding layer 14 may be a layer of optical clear resin (OCR) or a layer of optical clear adhesive (OCA), and the LCD layer 12 and the capacitive sensing layer 13 bonded together via the bonding layer 14 form an integral body to be stably positioned in the receiving space 112.

The electromagnetic sensing layer 15 is attached to one side of the backlight module 11 opposite to the LCD layer 12, so that the touch panel structure 1 is also able to compute the position of a pressure-sensitive stylus according to the change in the magnetic flux on the touch panel to thereby achieve the purpose of controlling the display on the touch panel through touching the latter with the pressure-sensitive stylus. With the capacitive sensing layer 13 and the electromagnetic sensing layer 15 being electrically integrated into the touch panel structure 1, the touch panel structure 1 provides more than one touch manner and is therefore more convenient for use.

Accordingly, the touch panel structure according to the present invention is superior to the conventional touch panel in that (1) it provides more than one touch manner; and (2) it is more convenient for use.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A touch panel structure, comprising:
   a backlight module having at least one extended wall portion integrated along an outer periphery thereof, and a receiving space being enclosed in the extended wall portion;
   a liquid crystal display (LCD) layer being arranged in the receiving space with outer peripheral edges thereof fitly contacting with the extended wall portion;
   a capacitive sensing layer being attached to one side of the LCD layer opposite to the backlight module, and also located in the receiving space with outer peripheral edges thereof fitly contacting with the extended wall portion;
   a bonding layer being applied to between the LCD layer and the capacitive sensing layer; and
   an electromagnetic sensing layer being attached to one side of the backlight module opposite to the LCD layer.

2. The touch panel structure as claimed in claim 1, wherein the bonding layer is correspondingly located in the receiving space.

3. The touch panel structure as claimed in claim 1, wherein the bonding layer is selected from the group consisting of optical clear resin (OCR) and optical clear adhesive (OCA).

* * * * *